(12) United States Patent
Huang

(10) Patent No.: US 11,579,410 B2
(45) Date of Patent: Feb. 14, 2023

(54) CAMERA LENS ASSEMBLY

(71) Applicant: Zhejiang Sunny Optical Co., Ltd., Ningbo (CN)

(72) Inventor: Lin Huang, Ningbo (CN)

(73) Assignee: Zhejiang Sunny Optical Co., Ltd.

( * ) Notice: Subject to any disclaimer, the term of this patent is extended or adjusted under 35 U.S.C. 154(b) by 567 days.

(21) Appl. No.: 15/772,744

(22) PCT Filed: Aug. 9, 2017

(86) PCT No.: PCT/CN2017/096591
§ 371 (c)(1),
(2) Date: May 1, 2018

(87) PCT Pub. No.: WO2018/192144
PCT Pub. Date: Oct. 25, 2018

(65) Prior Publication Data
US 2020/0257080 A1    Aug. 13, 2020

(30) Foreign Application Priority Data

Apr. 18, 2017  (CN) .......................... 201710255925.4
Apr. 18, 2017  (CN) .......................... 201720406880.1

(51) Int. Cl.
*G02B 13/00*       (2006.01)
*G02B 9/12*        (2006.01)
(Continued)

(52) U.S. Cl.
CPC ............. *G02B 13/004* (2013.01); *G02B 9/12* (2013.01); *G02B 9/34* (2013.01); *G02B 13/008* (2013.01); *G02B 13/0035* (2013.01); *G02B 13/14* (2013.01)

(58) Field of Classification Search
CPC .......... G02B 13/004; G02B 9/12; G02B 9/34; G02B 13/0035; G02B 13/0045; G02B 13/005; G02B 13/008; G02B 13/14
(Continued)

(56) References Cited

U.S. PATENT DOCUMENTS 7,193,793 B2    3/2007  Murakami et al.
8,345,359 B1 *  1/2013  Liang ................. G02B 13/0035
                                                    359/791
(Continued)

FOREIGN PATENT DOCUMENTS

CN          1677134 A     10/2005
CN        101135767 A      3/2008
(Continued)

OTHER PUBLICATIONS

CPO Search Report dated Mar. 28, 2017, 4 pages.
Evaluation Report dated Feb. 10, 2022, 8 pages.

*Primary Examiner* — George G. King
(74) *Attorney, Agent, or Firm* — Barnes & Thornburg LLP

(57) ABSTRACT

The present application discloses a camera lens assembly, the camera lens assembly, from an object side to an image side, sequentially including a first lens group and a second lens group, wherein the first lens group includes a first lens and a second lens; the second lens group includes at least a third lens; a filter is provided between the second lens group and the image side; and a radius of curvature of an object side surface of the first lens R1 and a radius of curvature of an image side surface of the first lens R2 satisfy: 0.5<R1/R2<1. The camera lens assembly according to the present application includes two sets of lens groups and the filter, and has characteristics of a low temperature sensitivity, a high image quality and miniaturization.

10 Claims, 10 Drawing Sheets

(51) Int. Cl.
G02B 9/34 (2006.01)
G02B 13/14 (2006.01)

(58) Field of Classification Search
USPC .............................. 359/772, 791, 795, 357
See application file for complete search history.

(56) References Cited

U.S. PATENT DOCUMENTS

| | | | |
|---|---|---|---|
| 8,902,513 B2 | 12/2014 | Ishizaka | |
| 2012/0206639 A1* | 8/2012 | Matsui | G02B 13/0035 348/340 |
| 2013/0044378 A1 | 2/2013 | Yin | |
| 2014/0146401 A1* | 5/2014 | Tsai | G02B 13/004 359/715 |
| 2014/0184880 A1* | 7/2014 | Ahn | G02B 13/004 348/342 |
| 2015/0029602 A1* | 1/2015 | Kubota | G02B 13/0035 359/791 |
| 2015/0085383 A1 | 3/2015 | Choi et al. | |
| 2015/0131172 A1* | 5/2015 | Park | G02B 9/62 359/759 |
| 2015/0168680 A1* | 6/2015 | Shih | G02B 13/008 359/357 |
| 2016/0161720 A1 | 6/2016 | Son | |
| 2016/0299316 A1* | 10/2016 | Shih | G02B 7/028 |
| 2017/0124392 A1 | 5/2017 | Gu et al. | |
| 2017/0219799 A1* | 8/2017 | Hsueh | G02B 9/34 |
| 2017/0235109 A1* | 8/2017 | Shin | G02B 9/34 359/708 |
| 2018/0120543 A1* | 5/2018 | Chang | G02B 9/34 |
| 2018/0348488 A1* | 12/2018 | Nishida | G02B 13/02 |

FOREIGN PATENT DOCUMENTS

| | | |
|---|---|---|
| CN | 102955225 A | 3/2013 |
| CN | 103403601 A | 11/2013 |
| CN | 203480119 U | 3/2014 |
| CN | 103955047 A | 7/2014 |
| CN | 204129314 U | 1/2015 |
| CN | 104635324 A | 5/2015 |
| CN | 105093492 A | 11/2015 |
| CN | 105137567 A | 12/2015 |
| CN | 105259641 A | 1/2016 |
| CN | 105445900 A | 3/2016 |
| CN | 105445903 A | 3/2016 |
| CN | 205333955 U | 6/2016 |
| CN | 106033142 A | 10/2016 |
| CN | 106405796 A | 2/2017 |
| CN | 106443972 A | 2/2017 |
| CN | 206039009 U | 3/2017 |
| WO | 2017023086 A1 | 2/2017 |

* cited by examiner

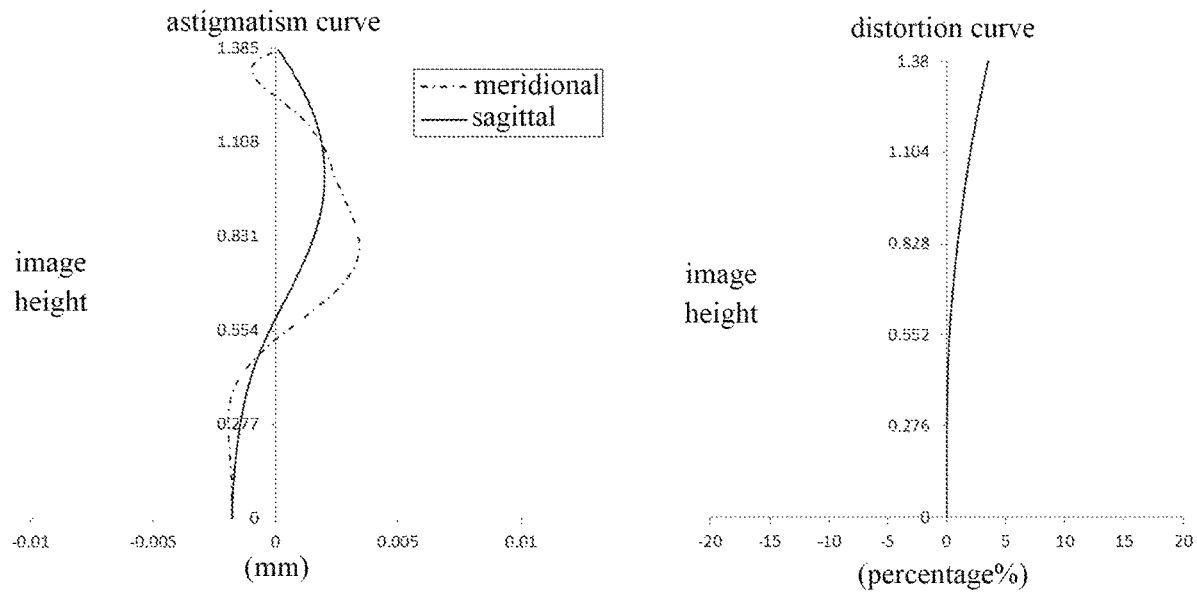
Fig. 27
Fig. 28
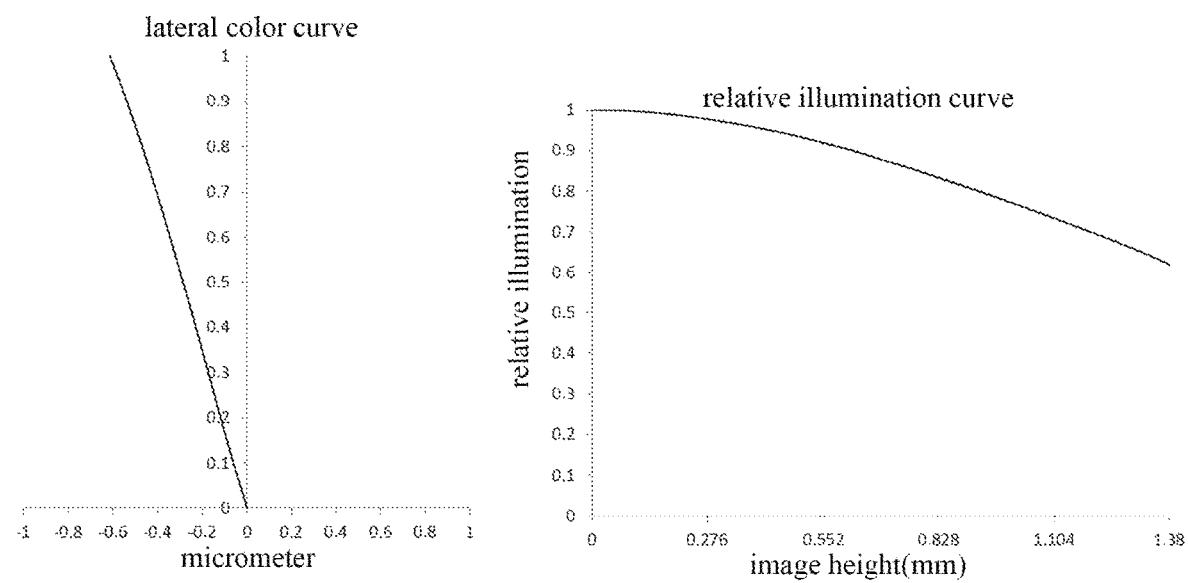
Fig. 29
Fig. 30

CAMERA LENS ASSEMBLY

CROSS-REFERENCE TO RELATED APPLICATIONS

This application is a national stage entry made under 35 U.S.C. § 371(b) of PCT International Application No. PCT/CN2017/096591, filed on Aug. 9, 2017, which claims the benefit of and priority to Chinese Patent Application No. 201710255925.4, filed with the State Intellectual Property Office of China (SIPO) on Apr. 18, 2017, and Chinese Patent Application No. 201720406880.1, filed with the SIPO on Apr. 18, 2017, the disclosures of which are incorporated herein by reference in their entirety.

TECHNICAL FIELD

The present disclosure relates to a camera lens assembly, and specifically to an iris camera lens assembly including two sets of lens groups.

BACKGROUND

In recent years, as the science and technology advance by leaps and bounds, the iris recognition technology as one of the biometric technologies is increasingly valued by the market. User identity confirmation is an important part in the information security, both the accuracy and the adaptability to the environment are extremely important, and thus the requirements on iris recognition technology are raised accordingly. As the application range of the iris recognition technology becomes wider, the lens assemblies used in this technology also need to meet the increasingly higher performance requirements. In particular, the adaptability in different environments should also be greatly enhanced.

Accordingly, the present invention intends to provide a miniaturized iris camera lens assembly with a high image quality and a low temperature sensitivity.

SUMMARY

The present disclosure provides a camera lens assembly, in order to solve at least some of the problems in the prior art.

According to an aspect, the present disclosure provides a camera lens assembly, the camera lens assembly including, sequentially from an object side to an image side, a first lens group and a second lens group, wherein the first lens group includes a first lens and a second lens; the second lens group includes at least a third lens; a filter is provided between the second lens group and the image side; and a radius of curvature of an object side surface of the first lens R1 and a radius of curvature of an image side surface of the first lens R2 satisfy: $0.5<R1/R2<1$.

According to another aspect, the present disclosure provides a camera lens assembly, the camera lens assembly, from an object side to an image side, sequentially including a first lens group and a second lens group, wherein the first lens group includes a first lens and a second lens; the second lens group includes at least a third lens; a filter is provided between the second lens group and the image side, and an effective radius of an object side surface of the first lens DT11 and an effective radius of an object side surface of the second lens DT21 satisfy: $1<DT11/DT21<1.5$.

According to another aspect, the present disclosure provides such a camera lens assembly, the camera lens assembly, from an object side to an image side, sequentially including a first lens group and a second lens group, wherein the first lens group includes a first lens and a second lens; the second lens group includes at least a third lens; a filter is provided between the second lens group and the image side, and a sum of a center thickness of each of the first lens to a last lens on an optical axis $\Sigma CT$ and an axial distance from an object side surface of the first lens to an image plane TTL satisfy: $0.3<\Sigma CT/TTL<0.5$.

According to an embodiment of the present disclosure, the first lens has a positive focal power, the object side surface of the first lens is a convex surface, and the image side surface of the first lens is a concave surface; the second lens has a positive focal power or a negative focal power; at least one of the first lens and the second lens is a glass lens, and the third lens has a negative focal power and an object side surface of the third lens is a concave surface.

According to an embodiment of the present disclosure, the first lens group has a positive focal power, and the second lens group has a negative focal power.

According to an embodiment of the present disclosure, $-1.2<F1/F2<-0.6$, F1 is an effective focal length of the first lens group, and F2 is an effective focal length of the second lens group.

According to an embodiment of the present disclosure, a diaphragm is disposed between the second lens and a to-be-tested object.

According to an embodiment of the present disclosure, $1<DT12/DT21<1.3$, DT12 is an effective radius of the image side surface of the first lens, and DT21 is the effective radius of the object side surface of the second lens.

According to an embodiment of the present disclosure, $0.3<CT2/CT1<0.8$, CT2 is a center thickness of the second lens on the optical axis, and CT1 is a center thickness of the first lens on the optical axis.

According to an embodiment of the present disclosure, the filter is an infrared (IR) filter.

The camera lens assembly according to the present disclosure includes two sets of lens groups and the filter, and has the characteristics of the low temperature sensitivity, the high image quality and the miniaturization.

BRIEF DESCRIPTION OF THE DRAWINGS

After reading detailed descriptions of non-limiting embodiments with reference to the following accompanying drawings, other features, objectives and advantages of the present application will be more apparent. In the accompanying drawings:

FIG. 26 to FIG. 30 respectively show a longitudinal aberration curve, an astigmatism curve, a distortion curve, a lateral color curve and a relative illumination curve of the camera lens assembly of embodiment 5.

DETAILED DESCRIPTION OF EMBODIMENTS

Figure 1:
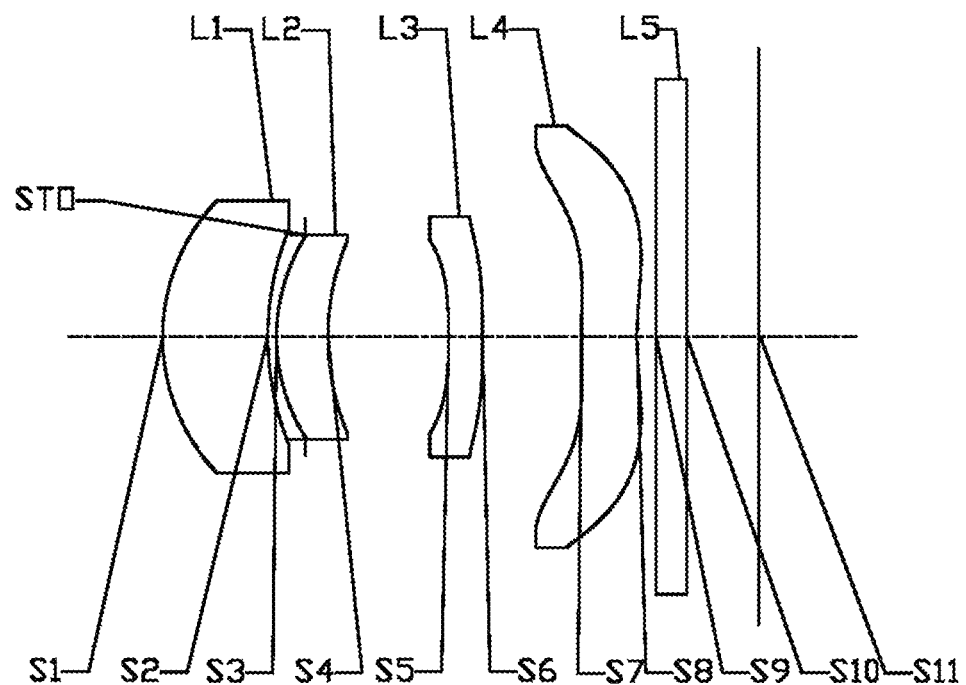
FIG. 1 is a schematic structural diagram illustrating a camera lens assembly according to embodiment 1.

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should be understood that in the present application, when an element or a layer is referred to as being "on," "connected to" or "coupled to" another element or layer, it can be directly on, connected or coupled to the other element or layer or intervening elements or layers may be present. By contrast, when an element is referred to as being "directly on," "directly connected to" or "directly coupled to" another element or layer, there are no intervening elements or layers present. The same reference numerals designate the same elements throughout this specification. As used herein, the term "and/or" includes any and all combinations of one or more of the associated listed items.

It should be understood that, although terms such as "first" and "second" may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section discussed below could be termed a second element, component, region, layer or section without departing from the teachings of example embodiments.

The terminology used herein is for the purpose of describing particular embodiments only and is not intended to limit the present application. As used herein, the singular forms "a," "an" and "the" are intended to include the plural forms as well, unless the context clearly indicates otherwise. It will be further understood that the terms "comprising," "including," "having" and variants thereof, when used in this specification, specify the presence of stated features, steps, operations, elements and/or components, but do not preclude the presence or addition of one or more other features, steps, operations, elements, components and/or groups thereof. As used herein, the term "and/or" includes any and all combinations of one or more of the associated listed items. Expressions, such as "at least one of," when preceding a list of elements, modify the entire list of elements rather than an individual element in the list. Further, the use of "may," when describing embodiments of the present application, relates to "one or more embodiments of the present application." In addition, the term "exemplary" is intended to refer to an example or illustration.

Unless otherwise defined, all terms (including technical and scientific terms) used herein have the same meaning as commonly understood by those of ordinary skill in the art to which the present application belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present application and the features in the embodiments may be combined with each other on a non-conflict basis. The present application will be described below in detail with reference to the accompanying drawings and in combination with the embodiments.

The present disclosure provides a camera lens assembly. The camera lens assembly according to the present disclosure, from an object side to an image side of the camera lens assembly, sequentially includes: a first lens group, a second lens group and a filter. The first lens group includes a first lens and a second lens. The second lens group includes at least a third lens.

In an embodiment of the present disclosure, the first lens group has a positive focal power, and the second lens group has a negative focal power. The camera lens assembly according to the embodiments of the present disclosure can achieve low temperature sensitivity and improve the iris recognition accuracy.

In an embodiment of the present disclosure, the first lens has a positive focal power, an object side surface of the first lens is a convex surface, and an image side surface of the first lens is a concave surface. The second lens has a positive focal power or a negative focal power. At least one of the first lens and the second lens is a glass lens. The third lens has a negative focal power and an object side surface of the third lens is a concave surface. The camera lens assembly according to the embodiments of the present disclosure has a low temperature sensitivity and a high image quality and is miniaturized.

In an embodiment of the present disclosure, a radius of curvature of the object side surface of the first lens R1 and a radius of curvature of the image side surface of the first lens R2 satisfy: $0.5 < R1/R2 < 1$, more specifically, satisfy: $0.518 \leq R1/R2 \leq 0.694$. Camera lens assemblies satisfying the above relationships can achieve an effect of enhancing the resolution.

In an embodiment of the present disclosure, an effective focal length of the first lens group F1 and an effective focal length of the second lens group F2 satisfy: $-1.2 < F1/F2 < -0.6$, and more specifically, satisfy: $-1.015 \leq F1/F2 \leq -0.803$. Camera lens assemblies satisfying the above relationships can achieve low temperature sensitivity and an effect of improving the iris recognition accuracy.

In an embodiment of the present disclosure, a diaphragm is disposed between the second lens and a to-be-tested object. The camera lens assembly according to this embodiment can achieve an effect of enhancing the resolution and reducing the tolerance sensitivity.

In an embodiment of the present disclosure, an effective radius of the image side surface of the first lens DT12 and an effective radius of an object side surface of the second lens DT21 satisfy: $1 < DT12/DT21 < 1.3$, and more specifically, satisfy: $1.017 \leq DT12/DT21 \leq 1.106$. Camera lens assemblies satisfying the above relationships can achieve an effect of reducing the size and enhancing the resolution.

In an embodiment of the present disclosure, a center thickness of the second lens on an optical axis CT2 and a center thickness of the first lens on the optical axis CT1 satisfy: 0.3<CT2/CT1<0.8, and more specifically, satisfy: 0.369≤CT2/CT1≤0.614. Camera lens assemblies satisfying the above relationships can achieve low temperature sensitivity and an effect of enhancing the resolution.

In an embodiment of the present disclosure, the filter is an infrared (IR) filter. The camera lens assembly according to this embodiment can achieve the band-pass of the IR wave band, cut off the other wave bands, and satisfy application requirements of the iris.

In an embodiment of the present disclosure, an effective radius of the object side surface of the first lens DT11 and the effective radius of the object side surface of the second lens DT21 satisfy: 1<DT11/DT21<1.5, and more specifically, satisfy: 1.331≤DT11/DT21≤1.427. Camera lens assemblies satisfying the above relationships can achieve an effect of reducing the size.

In an embodiment of the present disclosure, a sum of a center thickness of each of the first lens to a last lens on the optical axis ΣCT and an axial distance from the object side surface of the first lens to an image plane TTL satisfy: 0.3<ΣCT/TTL<0.5, and more specifically, satisfy: 0.305≤ΣCT/TTL≤0.413. Camera lens assemblies satisfying the above relationships can properly allocate sizes of the lenses and improve the effect of the resolution.

The present disclosure is further described below with reference to specific embodiments.

Embodiment 1

First, the camera lens assembly according to embodiment 1 of the present disclosure is described with reference to FIG. 1 to FIG. 6.

FIG. 1 is a schematic structural diagram illustrating a camera lens assembly according to embodiment 1. As shown in FIG. 1, the camera lens assembly includes four lenses. The four lenses are respectively: the first lens L1 having an object side surface S1 and an image side surface S2, the second lens L2 having an object side surface S3 and an image side surface S4, the third lens L3 having an object side surface S5 and an image side surface S6, and the fourth lens L4 having an object side surface S7 and an image side surface S8. The first to fourth lenses L1 to L4 are provided sequentially from the object side to the image side of the camera lens assembly. Here, the first lens L1 and the second lens L2 are the first lens group, and the third lens L3 and the fourth lens L4 are the second lens group. The first lens L1 may have a positive focal power, and the object side surface S1 of the first lens L1 may be a convex surface and the image side surface S2 is a concave surface. The second lens L2 may have a positive focal power, and the object side surface S3 of the second lens L2 may be a convex surface and the image side surface S4 may be a concave surface. The third lens L3 may have a negative focal power. The fourth lens L4 may have a negative focal power. The camera lens assembly further includes a filter L5 having an object side surface S9 and an image side surface S10 for filtering infrared light. In this embodiment, light from an object passes through the surfaces S1 to S10 sequentially and is finally imaged on an image plane S11.

In this embodiment, the first to fourth lenses L1 to L4 have their effective focal lengths f1 to f4, respectively. The first to fourth lenses L1 to L4 are arranged along the optical axis sequentially and jointly determine a total effective focal length f of the camera lens assembly. In this embodiment, the effective focal length of the first lens L1 f1=5.698; the effective focal length of the second lens L2 f2=7.055; the effective focal length of the third lens L3 f3=−9.583; the effective focal length of the fourth lens L4 f4=−7.245; and the total effective focal length of the camera lens assembly f=4.232. The total length of the camera lens assembly TTL=4.048. The f-number of the camera lens assembly Fno=2.48.

Table 1 below shows the surface type, the radius of curvature, the thickness, the refractive index, the abbe number and the conic coefficient of each lens in the camera lens assembly in this embodiment, wherein the unit for the radius of curvature and the thickness is millimeter (mm).

TABLE 1

| surface number | surface type | radius of curvature | thickness | material refractive index | abbe number | conic coefficient |
|---|---|---|---|---|---|---|
| OBJ | spherical | infinite | 300.0000 | | | |
| S1 | spherical | 1.3660 | 0.7136 | 1.551 | 62.56 | |
| S2 | spherical | 1.9684 | 0.2519 | | | |
| STO | spherical | infinite | −0.1930 | | | |
| S3 | aspheric | 1.2771 | 0.3494 | 1.536 | 56.11 | 0.1854 |
| S4 | aspheric | 1.7442 | 0.8192 | | | 0.8525 |
| S5 | aspheric | −4.2915 | 0.2300 | 1.620 | 23.53 | −6.5115 |
| S6 | aspheric | −15.7656 | 0.6708 | | | 1.0000 |
| S7 | aspheric | 5.7662 | 0.3771 | 1.536 | 56.11 | −94.4383 |
| S8 | aspheric | 2.2676 | 0.1298 | | | −46.6667 |
| S9 | spherical | infinite | 0.2100 | 1.517 | 64.17 | |
| S10 | spherical | infinite | 0.4887 | | | |
| S11 | spherical | infinite | | | | |

In the present embodiment, the surface type x of each aspheric surface is defined by the following formula (1):

$$x = \frac{ch^2}{1+\sqrt{1-(k+1)c^2h^2}} + \sum A_i h^i. \quad (1)$$

Here, x is the distance sagittal height to the vertex of the aspheric surface when the aspheric surface is at a position of a height h along the optical axis; c is the paraxial curvature of the aspheric surface, and c=1/r (i.e., the paraxial curvature c is the reciprocal of the radius of curvature R in the above Table 1); k is the conic constant (given in the Table 1); and $A_i$ is the correction coefficient of the $i^{th}$ order of the aspheric surface. Table 2 shows higher-order coefficients $A_4$, $A_6$, $A_8$, $A_{10}$, $A_{12}$, $A_{14}$, and $A_{16}$ applicable to the aspheric surfaces S3 to S8 of the aspheric lenses in this embodiment.

TABLE 2

| surface number | A4 | A6 | A8 | A10 | A12 | A14 | A16 |
|---|---|---|---|---|---|---|---|
| S3 | −1.9839E−02 | −8.4294E−02 | 3.6992E−01 | −1.2250E+00 | 1.8102E+00 | −1.0843E+00 | 0.0000E−00 |
| S4 | −6.3613E−05 | 8.2600E−02 | −6.3330E−01 | 1.6688E+00 | −2.4604E+00 | 1.3448E+00 | 0.0000E−00 |
| S5 | −4.0661E−01 | −2.8148E−01 | 2.9911E+00 | −1.3234E+01 | 2.8547E+01 | −2.8479E+01 | 8.8405E+00 |

TABLE 2-continued

| surface number | A4 | A6 | A8 | A10 | A12 | A14 | A16 |
|---|---|---|---|---|---|---|---|
| S6 | −3.6911E−01 | 5.7703E−01 | −1.2182E+00 | 2.5685E+00 | −3.4113E+00 | 3.1258E+00 | −1.3840E+00 |
| S7 | −4.8730E−01 | 4.9842E−01 | −4.6301E−01 | 2.7327E−01 | −4.6194E−02 | −1.7735E−02 | 5.6537E−03 |
| S8 | −1.9899E−01 | −8.2427E−02 | 3.3586E−01 | −4.2287E−01 | 2.7540E−01 | −9.3482E−02 | 1.3054E−02 |

Figure 2:
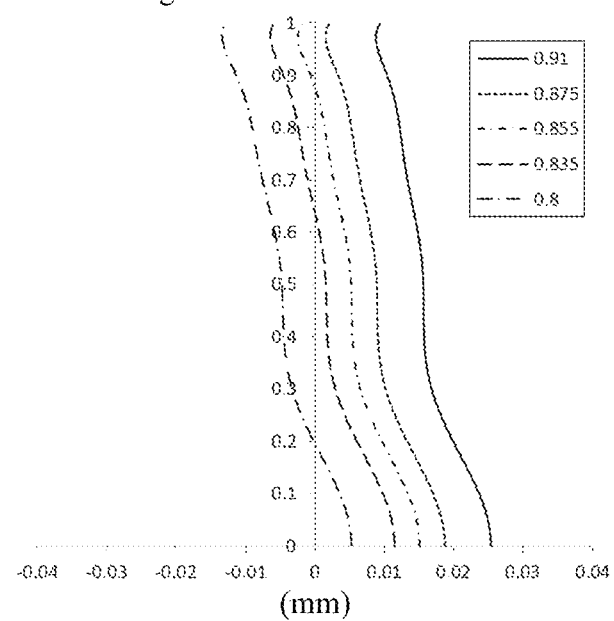
FIG. 2 to FIG. 6 respectively show a longitudinal aberration curve, an astigmatism curve, a distortion curve, a lateral color curve and a relative illumination curve of the camera lens assembly of embodiment 1.
Figure 3:
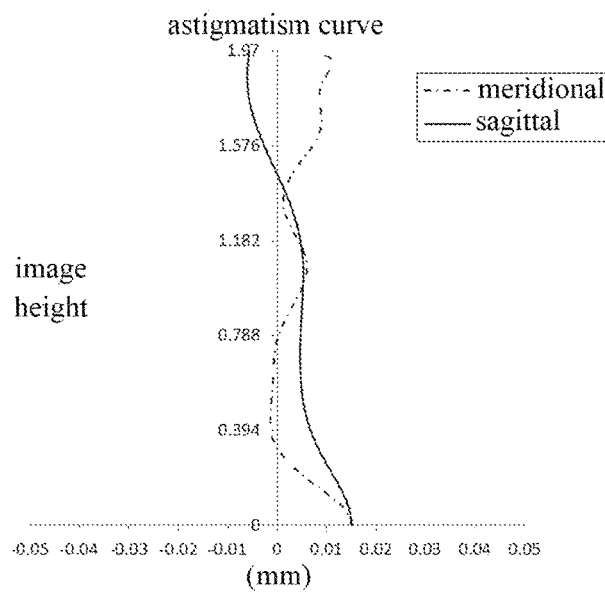
Figure 4:
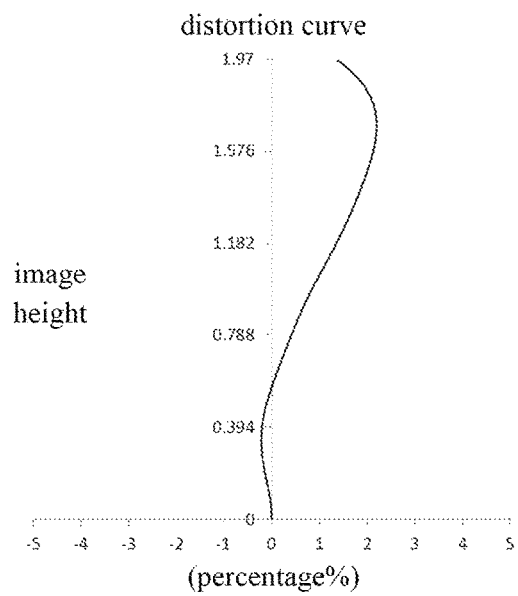
Figure 5:
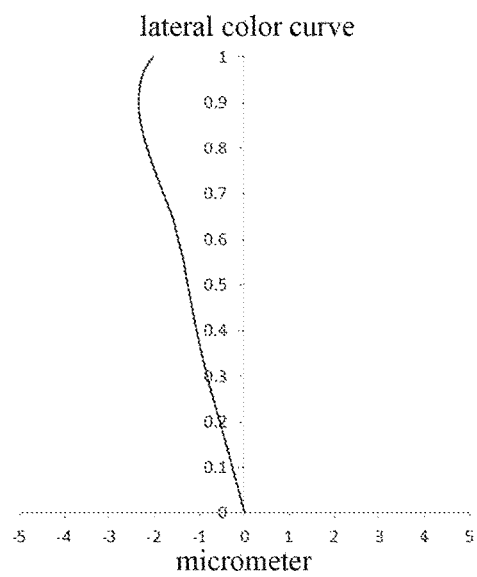
Figure 6:
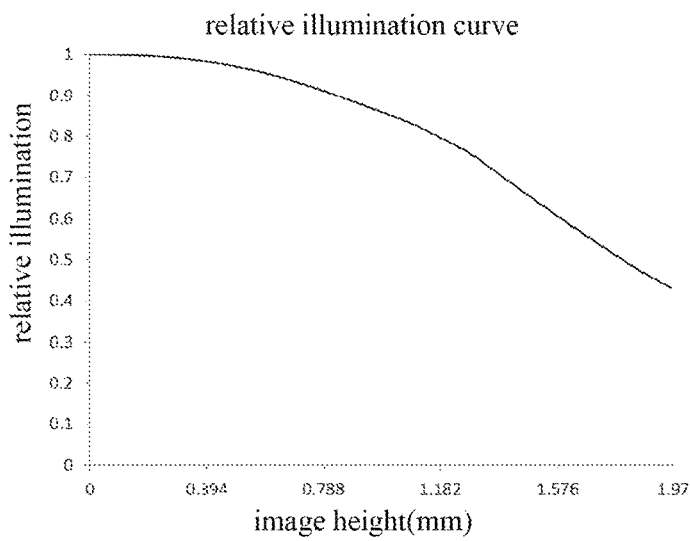

FIG. 2 shows a longitudinal aberration curve of the camera lens assembly according to embodiment 1, representing deviations of focal points of light of different wavelengths converged after passing through an optical system. FIG. 3 shows an astigmatism curve of the camera lens assembly according to embodiment 1, representing a curvature of a meridional image plane and a curvature of a sagittal image plane. FIG. 4 shows a distortion curve of the camera lens assembly according to embodiment 1, representing amounts of distortion at different viewing angles. FIG. 5 shows a lateral color curve of the camera lens assembly according to embodiment 1, representing deviations of different image heights on an image plane after light passes through the camera lens assembly. FIG. 6 shows a relative illumination curve of the camera lens assembly according to embodiment 1, representing a ratio of brightness of a peripheral screen and a center screen, and reflecting brightness uniformity of the screen. Based on the above and with reference to FIG. 2 to FIG. 6, it can be seen that the camera lens assembly according to embodiment 1 is a miniaturized camera lens assembly of the high image quality and the low temperature sensitivity.

Embodiment 2

The camera lens assembly according to embodiment 2 of the present disclosure is described with reference to FIG. 7 to FIG. 12.

Figure 7:
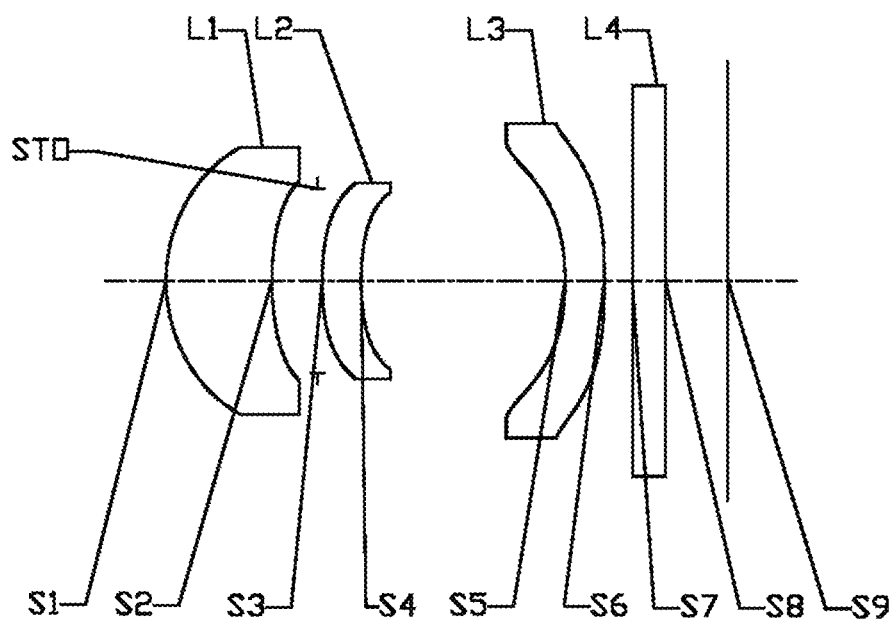
FIG. 7 is a schematic structural diagram illustrating a camera lens assembly according to embodiment 2.

FIG. 7 is a schematic structural diagram illustrating a camera lens assembly according to embodiment 2. As shown in FIG. 7, the camera lens assembly includes three lenses. The three lenses are respectively: the first lens L1 having an object side surface S1 and an image side surface S2, the second lens L2 having an object side surface S3 and an image side surface S4, and the third lens L3 having an object side surface S5 and an image side surface S6. The first lens L1 to the third lens L3 are provided sequentially from the object side to the image side of the camera lens assembly. Here, the first lens L1 and the second lens L2 are a first lens group, and the third lens L3 is a second lens group. The first lens L1 may have a positive focal power, and the object side surface S1 of the first lens L1 may be a convex surface and the image side surface S2 is a concave surface. The second lens L2 may have a positive focal power, and the object side surface S3 of the second lens L2 may be a convex surface and the image side surface S4 may be a concave surface. The third lens L3 may have a negative focal power. The camera lens assembly further includes a filter L4 having an object side surface S7 and an image side surface S8 for filtering infrared light. In this embodiment, light from an object passes through the surfaces S1 to S8 sequentially and is finally imaged on the image plane S9.

In this embodiment, the first lens L1 to the third lens L3 have their effective focal lengths f1 to f3, respectively. The first lens L1 to the third lens L3 are arranged along the optical axis sequentially and jointly determine a total effective focal length f of the camera lens assembly. In this embodiment, the effective focal length of the first lens L1 f1=3.458; the effective focal length of the second lens L2 f2=208.807; the effective focal length of the third lens L3 f3=−4.064; and the total effective focal length of the camera lens assembly f=3.988. The total length of the camera lens assembly TTL=3.589. The f-number of the camera lens assembly Fno=2.56.

Table 3 below shows the surface type, the radius of curvature, the thickness, the refractive index, the abbe number and the conic coefficient of each lens of the camera lens assembly in this embodiment.

TABLE 3

| sur- face num- ber | sur- face type | radius of curvature | thick- ness | refrac- tive index | abbe num- ber | conic coeffi- cient |
|---|---|---|---|---|---|---|
| OBJ | spherical | infinite | 500.0000 | | | |
| S1 | aspheric | 1.0496 | 0.6767 | 1.511 | 64.17 | 0.2415 |
| S2 | aspheric | 2.0244 | 0.2902 | | | 7.3756 |
| STO | spherical | Infinite | 0.0300 | | | |
| S3 | aspheric | 1.8485 | 0.2495 | 1.528 | 55.78 | 6.0584 |
| S4 | aspheric | 1.7923 | 1.3024 | | | 7.9141 |
| S5 | aspheric | −1.6298 | 0.2500 | 1.528 | 55.78 | −8.2320 |
| S6 | aspheric | −7.1273 | 0.1802 | | | −96.7887 |
| S7 | spherical | Infinite | 0.2100 | 1.517 | 64.17 | |
| S8 | spherical | infinite | 0.4000 | | | |
| S9 | spherical | infinite | | | | |

Table 4 shows higher-order coefficients $A_4$, $A_6$, $A_8$, $A_{10}$, $A_{12}$, $A_{14}$, and $A_{16}$ applicable to aspheric surfaces S1 to S6 of the aspheric lenses in this embodiment. Here, the respective aspheric surface types may be defined by the formula (1) given in the above embodiment 1.

TABLE 4

| surface number | A4 | A6 | A8 | A10 | A12 | A14 | A16 |
|---|---|---|---|---|---|---|---|
| S1 | −1.4997E−02 | −1.9400E−02 | 1.4354E−01 | −5.9301E−01 | 1.2546E+00 | −1.3337E+00 | 5.5769E−01 |
| S2 | 1.4080E−01 | −1.2529E−01 | 2.1054E+00 | −9.4535E+00 | 2.3099E+01 | −2.6522E+01 | 1.0825E+01 |
| S3 | 3.6686E−01 | 1.0451E−01 | 4.4684E−01 | −3.1561E+00 | 1.2979E+01 | −2.0675E+01 | 1.0034E+01 |
| S4 | 3.5986E−01 | 7.8044E−01 | −5.3606E+00 | 2.7148E+01 | −5.5201E+01 | 4.6383E+01 | −1.3849E+01 |
| S5 | −9.9174E−01 | 2.8964E+00 | −1.1036E+01 | 2.9201E+01 | −4.7668E+01 | 4.3402E+01 | −1.6145E+01 |
| S6 | −7.4645E−01 | 1.9085E+00 | −4.8299E+00 | 8.0632E+00 | −8.0890E+00 | 4.3698E+00 | −9.3204E−01 |

Figure 8:
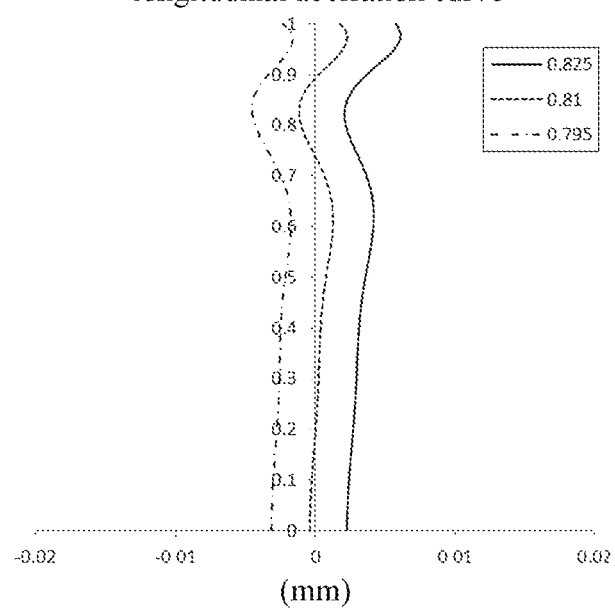
FIG. 8 to FIG. 12 respectively show a longitudinal aberration curve, an astigmatism curve, a distortion curve, a lateral color curve and a relative illumination curve of the camera lens assembly of embodiment 2.
Figure 9:
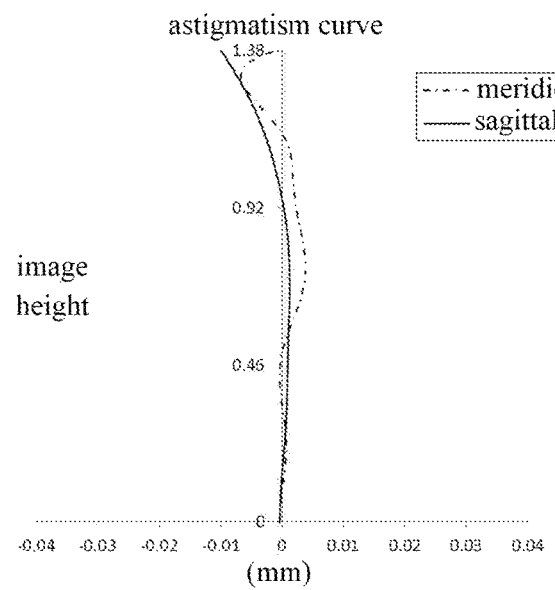
Figure 10:
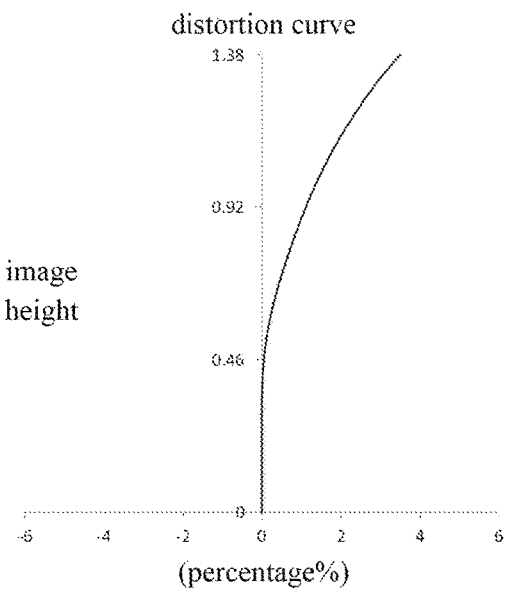
Figure 11:
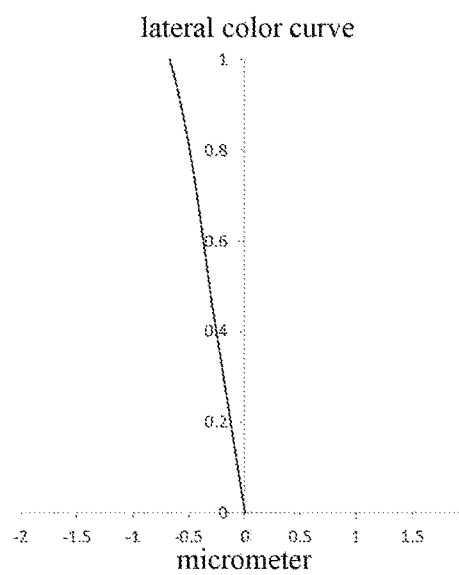
Figure 12:
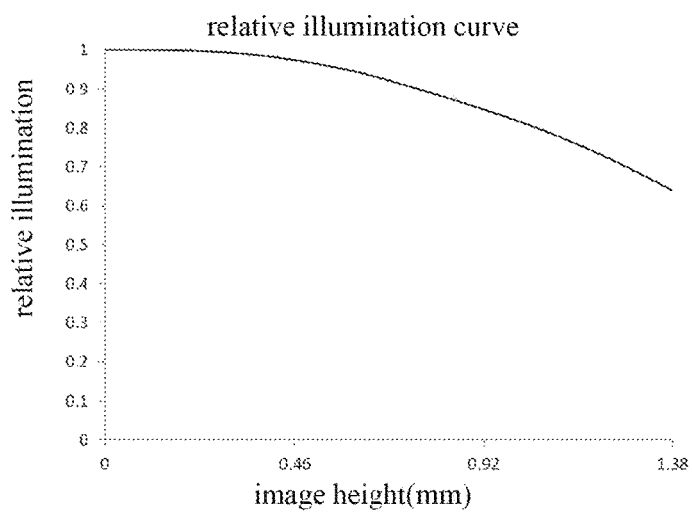

FIG. 8 shows a longitudinal aberration curve of the camera lens assembly according to embodiment 2, representing deviations of focal points of light of different wavelengths converged after passing through an optical system. FIG. 9 shows an astigmatism curve of the camera lens assembly according to embodiment 2, representing a curvature of a meridional image plane and a curvature of a sagittal image plane. FIG. 10 shows a distortion curve of the camera lens assembly according to embodiment 2, representing amounts of distortion at different viewing angles. FIG. 11 shows a lateral color curve of the camera lens assembly according to embodiment 2, representing deviations of different image heights on an image plane after light passes through the camera lens assembly. FIG. 12 shows a relative illumination curve of the camera lens assembly according to embodiment 2, representing a ratio of brightness of a peripheral screen and a center screen, and reflecting brightness uniformity of the screen. Based on the above and with reference to FIG. 8 to FIG. 12, it can be seen that the camera lens assembly according to embodiment 2 is a high image quality, low temperature sensitivity and miniaturized camera lens assembly.

Embodiment 3

The camera lens assembly according to embodiment 3 of the present disclosure is described with reference to FIG. 13 to FIG. 18.

Figure 13:
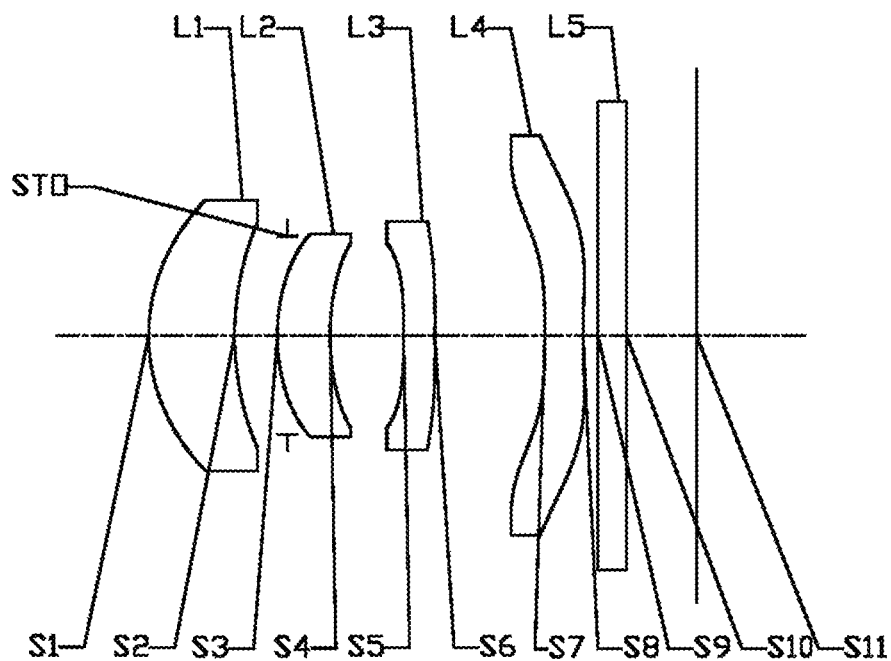
FIG. 13 is a schematic structural diagram illustrating a camera lens assembly according to embodiment 3.

FIG. 13 is a schematic structural diagram illustrating a camera lens assembly according to embodiment 3. In addition to parameters of the lenses of the camera lens assembly, for example, in addition to the radius of curvature, thickness, the refractive index, the abbe number, conic coefficient, the effective focal length, and the axial spacing of the lenses, and higher-order coefficients of the lenses, the camera lens assembly described in the present embodiment 3 is the same in arrangement and structure as the camera lens assembly described in embodiment 1. In the present embodiment, for the purpose of brevity, the description of parts similar to those in embodiment 1 will be omitted.

The camera lens assembly in embodiment 3 from an object side to an image side sequentially includes the first lens L1, the second lens L2, the third lens L3 and the fourth lens L4.

In this embodiment, the first to fourth lenses L1 to L4 have their effective focal lengths f1 to f4, respectively. The first to fourth lenses L1 to L4 are arranged along the optical axis sequentially and jointly determine a total effective focal length f of the camera lens assembly. In this embodiment, the effective focal length of the first lens L1 f1=4.844; the effective focal length of the second lens L2 f2=9.149; the effective focal length of the third lens L3 f3=−12.278; and the effective focal length of the fourth lens L4 f4=−5.628; and the total effective focal length of the camera lens assembly f=4.231. The total length of the camera lens assembly TTL=4.032. The f-number of the camera lens assembly Fno=2.38.

Table 5 below shows the surface type, the radius of curvature, the thickness, the refractive index, the abbe number and the conic coefficient of each lens of the camera lens assembly in this embodiment.

TABLE 5

| surface number | surface type | radius of curvature | thickness | refractive index | abbe number | conic coefficient |
|---|---|---|---|---|---|---|
| OBJ | spherical | infinite | 300.0000 | | | |
| S1 | aspheric | 1.3501 | 0.6328 | 1.581 | 61.25 | 0.1087 |
| S2 | aspheric | 2.1486 | 0.3876 | | | 0.0670 |
| STO | spherical | infinite | −0.0746 | | | |
| S3 | aspheric | 1.4079 | 0.3887 | 1.536 | 56.11 | 0.9013 |
| S4 | aspheric | 1.7846 | 0.5416 | | | 1.0000 |
| S5 | aspheric | −8.5623 | 0.2300 | 1.620 | 23.53 | 1.0000 |
| S6 | aspheric | 69.4394 | 0.8084 | | | −99.0000 |
| S7 | aspheric | −20.7834 | 0.2808 | 1.536 | 56.11 | 1.0000 |
| S8 | aspheric | 3.5455 | 0.1114 | | | −99.0000 |
| S9 | spherical | infinite | 0.2100 | 1.517 | 64.17 | |
| S10 | spherical | infinite | 0.5151 | | | |
| S11 | spherical | infinite | | | | |

Table 6 shows higher-order coefficients $A_4$, $A_6$, $A_8$, $A_{10}$, $A_{12}$, $A_{14}$, and $A_{16}$ applicable to aspheric surfaces S1 to S8 of the aspheric lenses in this embodiment. Here, the respective aspheric surface types may be defined by the formula (1) given in the above embodiment 1.

TABLE 6

| Surface number | A4 | A6 | A8 | A10 | A12 | A14 | A16 |
|---|---|---|---|---|---|---|---|
| S1 | −1.9163E−02 | −2.3965E−02 | 4.6180E−02 | −8.1330E−02 | 6.4838E−02 | −2.4498E−02 | 0.0000E+00 |
| S2 | −3.0374E−02 | 6.2390E−02 | −5.0943E−02 | 8.9245E−02 | −8.1187E−02 | 1.6325E−02 | 0.0000E+00 |
| S3 | −6.4342E−02 | 1.3823E−01 | −2.7791E−01 | 1.2451E+00 | −2.0584E+00 | 1.4526E+00 | 0.0000E+00 |
| S4 | −5.6640E−02 | 2.3728E−01 | −8.6948E−01 | 4.0773E+00 | −7.7811E+00 | 6.6038E+00 | 0.0000E+00 |
| S5 | −3.9570E−01 | −6.7974E−01 | −5.8443E−02 | 3.3667E+00 | −1.9799E+01 | 4.3653E+01 | −3.7083E+01 |
| S6 | −2.5800E−01 | 2.6521E−01 | −2.4382E−01 | 3.7022E−01 | 1.8721E−01 | −9.6338E−01 | 5.2569E−01 |
| S7 | −4.7462E−01 | 5.5739E−01 | −5.3972E−01 | 5.2256E−01 | −3.2394E−01 | 1.0439E−01 | −1.3594E−02 |
| S8 | −3.0802E−01 | 2.2750E−01 | −1.5466E−01 | 1.0199E−01 | −5.0170E−02 | 1.5751E−02 | −2.2693E−03 |

Figure 14:
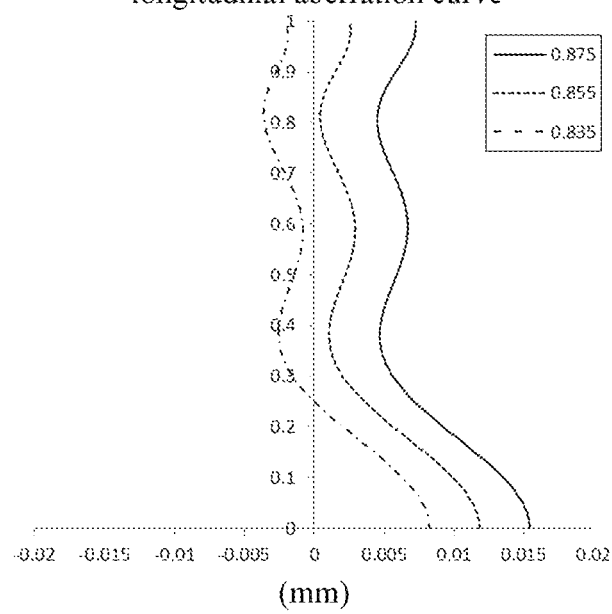
FIG. 14 to FIG. 18 respectively show a longitudinal aberration curve, an astigmatism curve, a distortion curve, a lateral color curve and a relative illumination curve of the camera lens assembly of embodiment 3.
Figure 15:
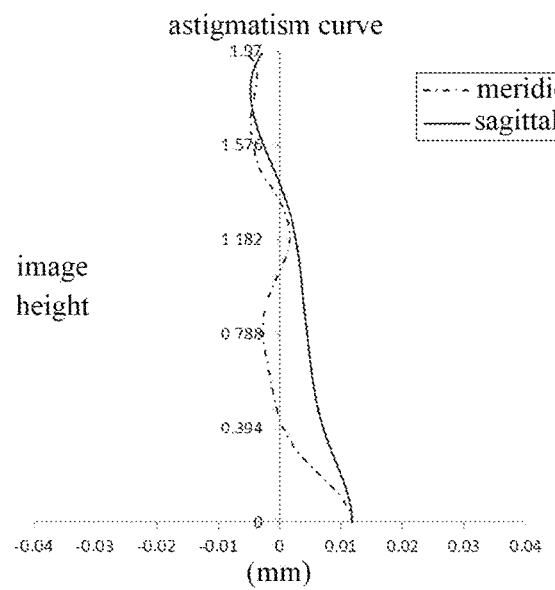
Figure 16:
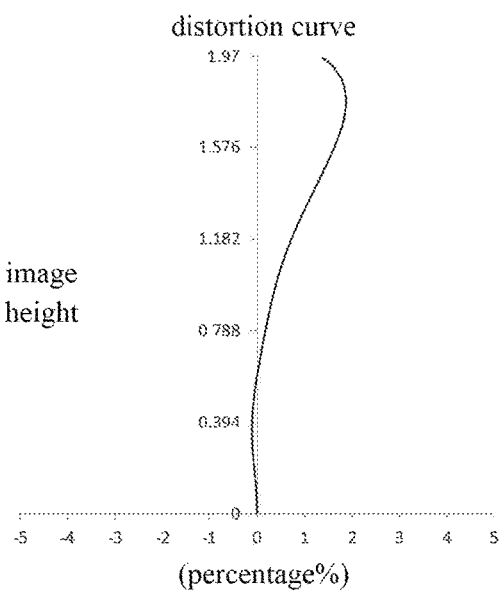
Figure 17:
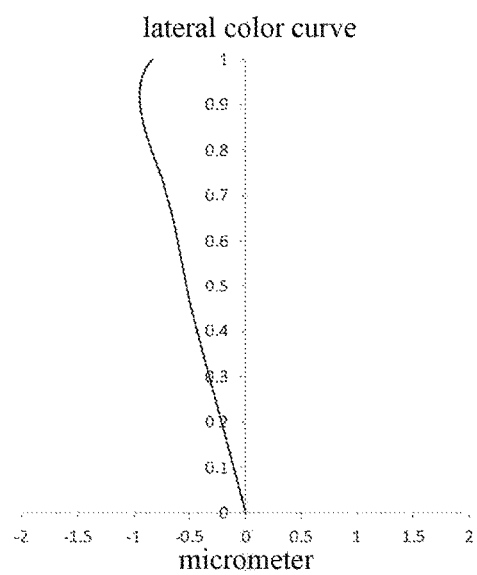
Figure 18:
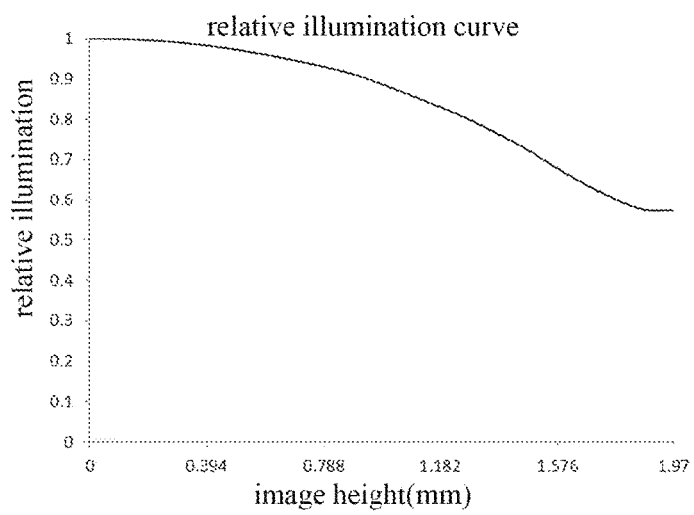

FIG. 14 shows a longitudinal aberration curve of the camera lens assembly according to embodiment 3, representing deviations of focal points of light of different wavelengths converged after passing through an optical system. FIG. 15 shows an astigmatism curve of the camera lens assembly according to embodiment 3, representing a curvature of a meridional image plane and a curvature of a sagittal image plane. FIG. 16 shows a distortion curve of the camera lens assembly according to embodiment 3, representing amounts of distortion at different viewing angles. FIG. 17 shows a lateral color curve of the camera lens assembly according to embodiment 3, representing deviations of different image heights on an image plane after light passes through the camera lens assembly. FIG. 18 shows a relative illumination curve of the camera lens assembly according to embodiment 3, representing a ratio of brightness of a peripheral screen and a center screen, and reflecting brightness uniformity of the screen. Based on the above and with reference to FIG. 14 to FIG. 18, it can be seen that the camera lens assembly according to embodiment 3 is a miniaturized camera lens assembly of the high image quality and the low temperature sensitivity.

Embodiment 4

The camera lens assembly according to embodiment 4 of the present disclosure is described with reference to FIG. 19 to FIG. 24.

Figure 19:
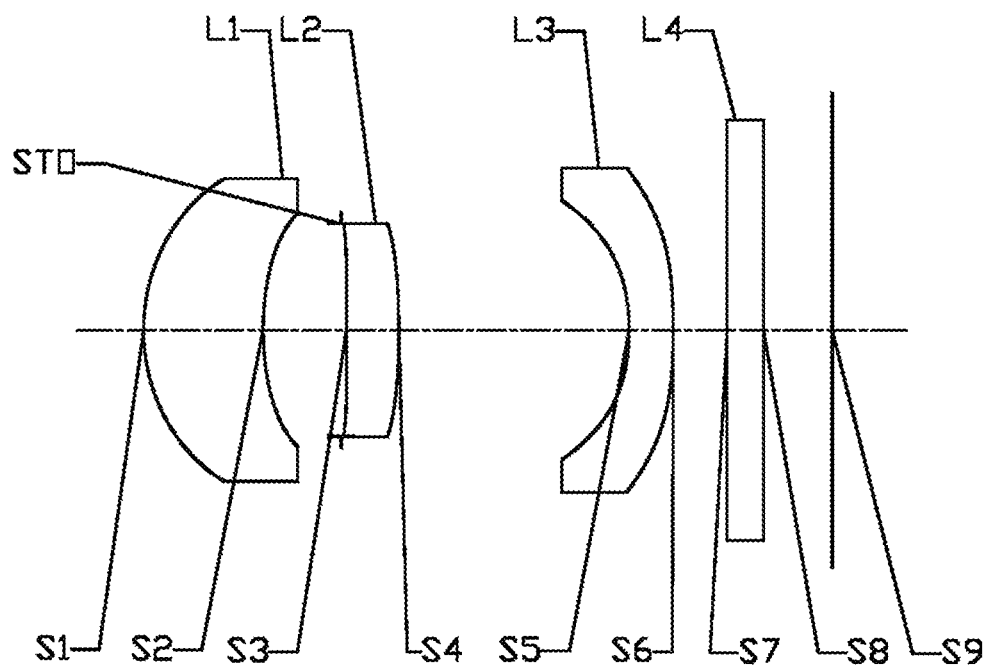
FIG. 19 is a schematic structural diagram illustrating a camera lens assembly according to embodiment 4.

FIG. 19 is a schematic structural diagram illustrating a camera lens assembly according to embodiment 4. In addition to parameters of the lenses of the camera lens assembly, for example, in addition to the radius of curvature, thickness, the refractive index, the abbe number, the conic coefficient, the effective focal length, and the axial spacing of the lenses, and higher-order coefficients of the lenses, the camera lens assembly described in the present embodiment 4 is the same in arrangement and structure as the camera lens assembly described in embodiment 2. In the present embodiment, for the purpose of brevity, the description of parts similar to those in embodiment 2 will be omitted.

The camera lens assembly in embodiment 4 from an object side to an image side sequentially includes the first lens L1, the second lens L2 and the third lens L3.

In this embodiment, the first lens L1 to the third lens L3 have their effective focal lengths f1 to f3, respectively. The first lens L1 to the third lens L3 are arranged along the optical axis sequentially and jointly determine a total effective focal length f of the camera lens assembly. In this embodiment, the effective focal length of the first lens L1 f1=4.439; the effective focal length of the second lens L2 f2=7.874; the effective focal length of the third lens L3 f3=−3.216; and the total effective focal length of the camera lens assembly f=4.317. The total length of the camera lens assembly TTL=4.000. The f-number of the camera lens assembly Fno=2.55.

Table 7 below shows the surface type, the radius of curvature, the thickness, the refractive index, the abbe number and the conic coefficient of each lens of the camera lens assembly in this embodiment.

TABLE 7

| surface number | surface type | radius of curvature | thickness | material refractive index | abbe number | conic coefficient |
|---|---|---|---|---|---|---|
| OBJ | spherical | infinite | 500.0000 | | | |
| S1 | aspheric | 1.1129 | 0.6946 | 1.511 | 64.17 | 0.3003 |

TABLE 7-continued

| surface number | surface type | radius of curvature | thickness | material refractive index | abbe number | conic coefficient |
|---|---|---|---|---|---|---|
| S2 | aspheric | 1.7252 | 0.4533 | | | 4.5984 |
| STO | spherical | infinite | 0.0300 | | | |
| S3 | aspheric | 50.9391 | 0.3047 | 1.528 | 55.78 | −99.0000 |
| S4 | aspheric | −4.5206 | 1.3376 | | | 31.9451 |
| S5 | aspheric | −1.2629 | 0.2553 | 1.528 | 55.78 | −0.1544 |
| S6 | aspheric | −5.2637 | 0.3145 | | | 23.9993 |
| S7 | spherical | infinite | 0.2100 | 1.517 | 64.17 | |
| S8 | spherical | infinite | 0.4000 | | | |
| S9 | spherical | infinite | | | | |

Table 8 shows higher-order coefficients $A_4$, $A_6$, $A_8$, $A_{10}$, $A_{12}$, $A_{14}$, and $A_{16}$ applicable to aspheric surfaces S1 to S6 of the aspheric lenses in this embodiment. Here, the respective aspheric surface types may be defined by the formula (1) given in the above embodiment 1.

TABLE 8

| Surface number | A4 | A6 | A8 | A10 | A12 | A14 | A16 |
|---|---|---|---|---|---|---|---|
| S1 | −1.7061E−02 | 1.6614E−02 | −9.8372E−02 | 1.8701E−01 | −1.8653E−01 | 6.2571E−02 | 3.0007E−03 |
| S2 | 2.8203E−02 | −6.4735E−03 | 7.0953E−02 | −8.2129E−02 | 3.9392E−02 | −8.6076E−03 | 6.9762E−04 |
| S3 | −8.1710E−02 | −1.4012E−01 | 3.3576E−01 | −1.6399E+00 | 2.7605E+00 | −1.7467E+00 | 3.7598E−01 |
| S4 | −6.1616E−02 | −9.2329E−03 | −3.0795E−01 | 5.9074E−01 | −3.8938E−01 | 1.0931E−01 | −1.1170E−02 |
| S5 | −6.4306E−01 | 1.1034E+00 | −3.5280E+00 | 8.3223E+00 | −1.3443E+01 | 1.1974E+01 | −3.9276E+00 |
| S6 | −5.3847E−01 | 1.1323E+00 | −2.4013E+00 | 3.7633E+00 | −3.6815E+00 | 1.9886E+00 | −4.2690E−01 |

Figure 20:
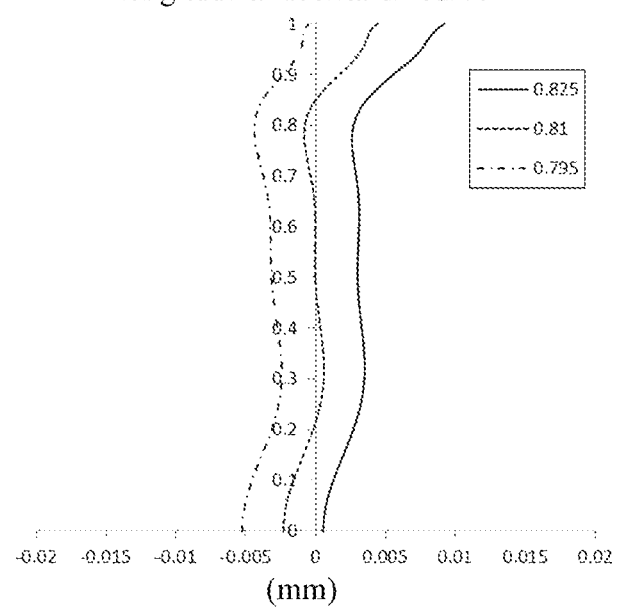
FIG. 20 to FIG. 24 respectively show a longitudinal aberration curve, an astigmatism curve, a distortion curve, a lateral color curve and a relative illumination curve of the camera lens assembly of embodiment 4.
Figure 21:
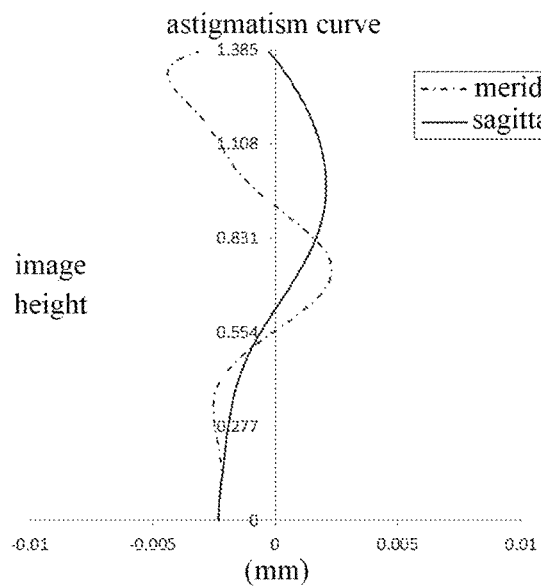
Figure 22:
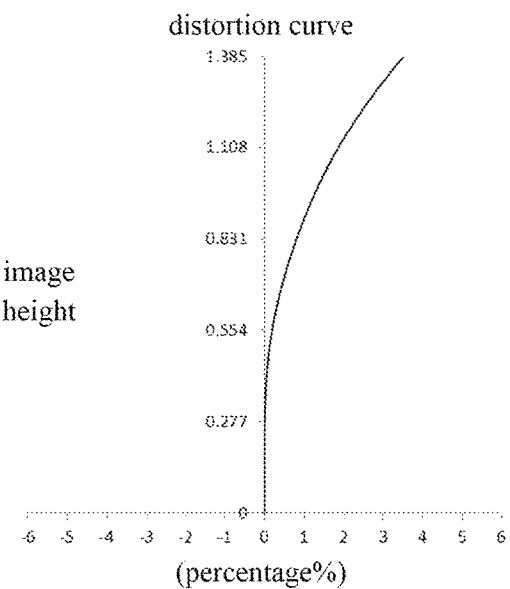
Figure 23:
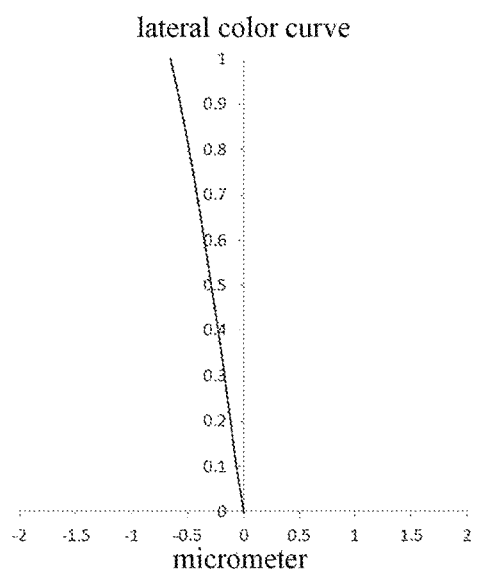
Figure 24:
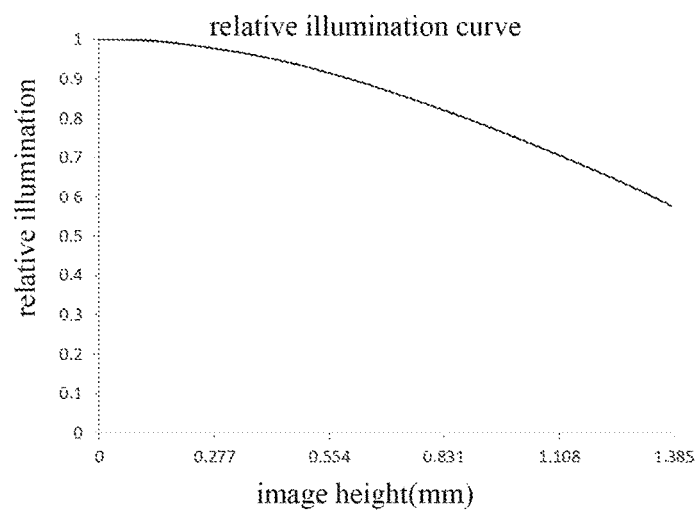

FIG. 20 shows a longitudinal aberration curve of the camera lens assembly according to embodiment 4, representing deviations of focal points of light of different wavelengths converged after passing through an optical system. FIG. 21 shows an astigmatism curve of the camera lens assembly according to embodiment 4, representing a curvature of a meridional image plane and a curvature of a sagittal image plane. FIG. 22 shows a distortion curve of the camera lens assembly according to embodiment 4, representing amounts of distortion at different viewing angles. FIG. 23 shows a lateral color curve of the camera lens assembly according to embodiment 4, representing deviations of different image heights on an image plane after light passes through the camera lens assembly. FIG. 24 shows a relative illumination curve of the camera lens assembly according to embodiment 4, representing a ratio of brightness of a peripheral screen and a center screen, and reflecting brightness uniformity of the screen. Based on the above and with reference to FIG. 20 to FIG. 24, it can be seen that the camera lens assembly according to embodiment 4 is a miniaturized camera lens assembly of the high image quality and the low temperature sensitivity.

Embodiment 5

The camera lens assembly according to embodiment 5 of the present disclosure is described with reference to FIG. 25 to FIG. 30.

Figure 25:
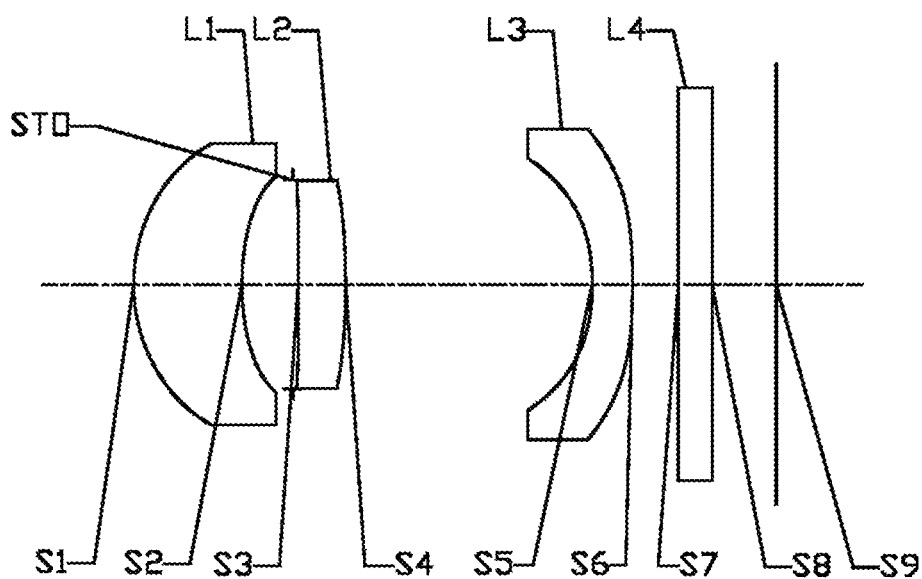
FIG. 25 is a schematic structural diagram illustrating a camera lens assembly according to embodiment 5.

FIG. 25 is a schematic structural diagram illustrating a camera lens assembly according to embodiment 5. In addition to parameters of the lenses of the camera lens assembly, for example, in addition to the radius of curvature, thickness, the refractive index, the abbe number, the conic coefficient, the effective focal length, and the axial spacing of the lenses, and the higher-order coefficients of the lenses, the camera lens assembly described in the present embodiment 5 is the same in arrangement and structure as the camera lens assembly described in embodiment 2. In the present embodiment, for the purpose of brevity, the description of parts similar to those in embodiment 2 will be omitted.

The camera lens assembly in embodiment 5 from an object side to an image side sequentially includes the first lens L1, the second lens L2 and the third lens L3.

In this embodiment, the first lens L1 to the third lens L3 have their effective focal lengths f1 to f3, respectively. The first lens L1 to the third lens L3 are arranged along the optical axis sequentially and jointly determine a total effective focal length f of the camera lens assembly. In this embodiment, the effective focal length of the first lens L1 f1=4.468; the effective focal length of the second lens L2 f2=9.207; the effective focal length of the third lens L3 f3=−3.446; and the total effective focal length of the camera lens assembly f=4.346. The total length of the camera lens assembly TTL=4.000. The f-number of the camera lens assembly Fno=2.56.

Table 9 below shows the surface type, the radius of curvature, the thickness, the refractive index, the abbe number and the conic coefficient of each lens of the camera lens assembly in this embodiment.

Figure 26:
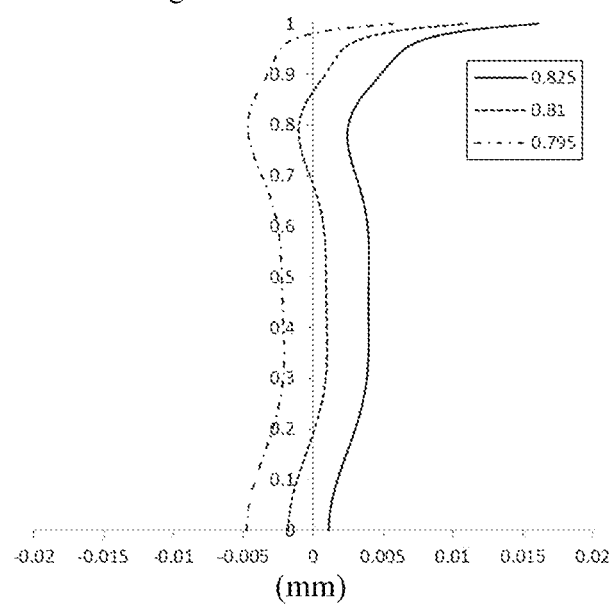

FIG. 26 shows a longitudinal aberration curve of the camera lens assembly according to embodiment 5, representing deviations of focal points of light of different wavelengths converged after passing through an optical system. FIG. 27 shows an astigmatism curve of the camera lens assembly according to embodiment 5, representing a curvature of a meridional image plane and a curvature of a sagittal image plane. FIG. 28 shows a distortion curve of the camera lens assembly according to embodiment 5, representing amounts of distortion at different viewing angles. FIG. 29 shows a lateral color curve of the camera lens assembly according to embodiment 5, representing deviations of different image heights on an image plane after light passes through the camera lens assembly. FIG. 30 shows a relative illumination curve of the camera lens assembly according to embodiment 5, representing a ratio of brightness of a peripheral screen and a center screen, and reflecting brightness uniformity of the screen. Based on the above and with reference to FIG. 26 to FIG. 30, it can be seen that the camera lens assembly according to embodiment 5 is a miniaturized camera lens assembly of the high image quality and the low temperature sensitivity.

In the following Table 11, the f-number Fno, the total length TTL, and the total effective focal length f of each camera lens assembly in embodiment 1 to 5, and the effective focal length values of the lenses in the camera lens assemblies are listed.

TABLE 9

| surface number | surface type | radius of curvature | thickness | refractive index | abbe number | conic coefficient |
|---|---|---|---|---|---|---|
| OBJ | spherical | infinite | 500.0000 | | | |
| S1 | aspheric | 1.0988 | 0.6739 | 1.511 | 64.17 | 0.2933 |
| S2 | aspheric | 1.6804 | 0.3164 | | | 4.4015 |
| STO | spherical | infinite | 0.0328 | | | |
| S3 | aspheric | −2584.3020 | 0.2963 | 1.528 | 55.78 | 50.0000 |
| S4 | aspheric | −4.8553 | 1.5355 | | | 37.9119 |
| S5 | aspheric | −1.3992 | 0.2500 | 1.528 | 55.78 | −0.3333 |
| S6 | aspheric | −6.4187 | 0.2851 | | | −2.4075 |
| S7 | spherical | infinite | 0.2100 | 1.517 | 64.17 | |
| S8 | spherical | infinite | 0.4000 | | | |
| S9 | spherical | infinite | | | | |

Table 10 shows higher-order coefficients $A_4$, $A_6$, $A_8$, $A_{10}$, $A_{12}$, $A_{14}$, and $A_{16}$ applicable to aspheric surfaces S1 to S6 of the aspheric lenses in this embodiment. Here, the respective aspheric surface types may be defined by the formula (1) given in the above embodiment 1.

TABLE 11

| | embodiment | | | | |
|---|---|---|---|---|---|
| | 1 | 2 | 3 | 4 | 5 |
| Fno | 2.48 | 2.56 | 2.38 | 2.55 | 2.56 |
| f (mm) | 4.232 | 3.988 | 4.231 | 4.317 | 4.346 |
| f1 (mm) | 5.698 | 3.458 | 4.844 | 4.439 | 4.468 |
| f2 (mm) | 7.055 | 208.807 | 9.149 | 7.874 | 9.207 |
| f3 (mm) | −9.583 | −4.064 | −12.278 | −3.216 | −3.446 |
| f4 (mm) | −7.245 | — | −5.628 | — | — |
| TTL (mm) | 4.048 | 3.589 | 4.032 | 4.000 | 4.000 |

The relationships between the parameter values in the respective camera lens assemblies of embodiment 1 to 5 are listed in the Table 12 below.

TABLE 12

| conditional expression | embodiment | | | | |
|---|---|---|---|---|---|
| | 1 | 2 | 3 | 4 | 5 |
| F1/F2 | −0.865 | −0.803 | −0.900 | −1.015 | −0.978 |
| R1/R2 | 0.694 | 0.518 | 0.628 | 0.645 | 0.654 |

TABLE 10

| Surface number | A4 | A6 | A8 | A10 | A12 | A14 | A16 |
|---|---|---|---|---|---|---|---|
| S1 | −1.5150E−02 | 1.8864E−02 | −9.4871E−02 | 1.7678E−01 | −1.8416E−01 | 7.0387E−02 | −1.7232E−03 |
| S2 | 4.3472E−02 | 2.7384E−02 | 3.2157E−03 | 1.8646E−02 | −3.2132E−02 | 1.4283E−02 | −2.0210E−03 |
| S3 | −8.5999E−03 | −9.2050E−02 | 2.5050E−01 | −1.0572E+00 | 1.4318E+00 | −7.4848E−01 | 1.3518E−01 |
| S4 | 1.0079E−02 | −6.9494E−03 | −1.3089E−01 | 1.5639E−01 | −6.9518E−02 | 1.3565E−02 | −9.7796E−04 |
| S5 | −6.1984E−01 | 1.1321E+00 | −2.7911E+00 | 3.1137E+00 | 1.0271E+00 | −6.6380E+00 | 4.9296E+00 |
| S6 | −5.5645E−01 | 1.1826E+00 | −2.5080E+00 | 3.6295E+00 | −3.2157E+00 | 1.5364E+00 | −2.8984E−01 |

TABLE 12-continued

| conditional expression | embodiment | | | | |
|---|---|---|---|---|---|
| | 1 | 2 | 3 | 4 | 5 |
| DT11/DT21 | 1.331 | 1.360 | 1.334 | 1.427 | 1.356 |
| DT12/DT21 | 1.055 | 1.017 | 1.106 | 1.097 | 1.041 |
| ΣCT/TTL | 0.413 | 0.328 | 0.380 | 0.314 | 0.305 |
| CT2/CT1 | 0.490 | 0.369 | 0.614 | 0.439 | 0.440 |

Here, F1/F2 is the ratio of the effective focal length of the first lens group to the effective focal length of the second lens group; R1/R2 is the ratio of the radius of curvature of the object side surface of the first lens to the radius of curvature of the image side surface of the first lens; DT11/DT21 is the ratio of the effective radius of the object side surface of the first lens to the effective radius of the object side surface of the second lens; DT12/DT21 is the ratio of the effective radius of the image side surface of the first lens to the effective radius of the object side surface of the second lens; ΣCT/TTL is the ratio of the sum of a center thickness of each of the first lens to the last lens having a focal power on the optical axis to an axial distance from the center of the object side surface of the first lens to the image plane; and CT2/CT1 is the ratio of the center thickness of the second lens on the optical axis to the center thickness of the first lens on the optical axis.

The foregoing is only a description of the preferred embodiments of the present application and the applied technical principles. It should be appreciated by those skilled in the art that the inventive scope of the present application is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present application with (but not limited to), technical features with similar functions.

What is claimed is:

1. A camera lens assembly comprising sequentially, from an object side to an image side, a first lens group and a second lens group,
    the first lens group comprising a first lens having a refractive power and a second lens having a refractive power;
    the second lens group comprising a third lens having a refractive power and a fourth lens having a refractive power;
    a filter being provided between the second lens group and the image side, wherein the filter is an infrared (IR) filter, which band-passes light in IR band and cuts off light in other bands; and
    a radius of curvature of an object side surface of the first lens R1 and a radius of curvature of an image side surface of the first lens R2 satisfying: $0.5<R1/R2<1$,
    wherein $1<DT12/DT21<1.3$, DT12 is an effective radius of the image side surface of the first lens, and DT21 is an effective radius of an object side surface of the second lens,
    wherein $0.3<\Sigma CT/TTL<0.5$, ΣCT is a sum of a center thickness of each of the first lens to a last lens on an optical axis, and TTL is an axial distance from the object side surface of the first lens to an image plane,
    wherein an effective focal length f3 of the third lens satisfies: $-12.278 \text{ mm} \le f3 \le -9.583 \text{ mm}$,
    wherein a number of lenses with focal power in the camera lens assembly is equal to four.

2. The camera lens assembly according to claim 1, wherein,
    the first lens has a positive focal power, the object side surface of the first lens is a convex surface, and the image side surface of the first lens is a concave surface;
    the second lens has a positive focal power or a negative focal power;
    at least one of the first lens and the second lens is a glass lens; and
    the third lens has a negative focal power and an object side surface of the third lens is a concave surface.

3. The camera lens assembly according to claim 1, wherein $-1.2<F1/F2<-0.6$, F1 is an effective focal length of the first lens group, and F2 is an effective focal length of the second lens group.

4. The camera lens assembly according to claim 1, wherein $1<DT11/DT21<1.5$, DT11 is an effective radius of the object side surface of the first lens, and DT21 is the effective radius of the object side surface of the second lens.

5. The camera lens assembly according to claim 1, wherein $0.3<CT2/CT1<0.8$, CT2 is a center thickness of the second lens on the optical axis, and CT1 is a center thickness of the first lens on the optical axis.

6. The camera lens assembly according to claim 1, wherein the first lens group has a positive focal power, and the second lens group has a negative focal power.

7. The camera lens assembly according to claim 1, wherein a stop is disposed to the object side of the second lens.

8. The camera lens assembly according to claim 1, wherein an effective focal length f1 of the first lens satisfies: $4.844 \text{ mm} \le f1 \le 5.698 \text{ mm}$.

9. The camera lens assembly according to claim 1, wherein the first lens has a positive focal power, the second lens has a positive focal power, the third lens has a negative focal power, and the fourth lens has a negative focal power.

10. The camera lens assembly according to claim 1, wherein a distance T23 on the optical axis between the image-side surface of the second lens to the object-side surface of the third lens satisfies: $0.5416 \text{ mm} \le T23 \le 0.8192 \text{ mm}$.

* * * * *